(12) United States Patent
Streeter et al.

(10) Patent No.: US 11,543,187 B2
(45) Date of Patent: Jan. 3, 2023

(54) HEAT EXCHANGER WITH BUILD POWDER IN BARRIER CHANNELS

(71) Applicant: Hamilton Sundstrand Corporation, Charlotte, NC (US)

(72) Inventors: James Streeter, Torrington, CT (US); Michael Zager, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 588 days.

(21) Appl. No.: 16/563,414

(22) Filed: Sep. 6, 2019

(65) Prior Publication Data

US 2021/0071959 A1 Mar. 11, 2021

(51) Int. Cl.
| | | |
|---|---|---|
| *F28D 7/00* | (2006.01) |
| *B33Y 70/00* | (2020.01) |
| *B33Y 80/00* | (2015.01) |
| *F28F 27/00* | (2006.01) |
| *B33Y 10/00* | (2015.01) |
| *B22F 10/00* | (2021.01) |

(52) U.S. Cl.
CPC ............ *F28D 7/0025* (2013.01); *B33Y 70/00* (2014.12); *B33Y 80/00* (2014.12); *F28F 27/00* (2013.01); *B22F 10/00* (2021.01); *B22F 2301/15* (2013.01); *B33Y 10/00* (2014.12)

(58) Field of Classification Search
CPC ......... F28D 7/0025; F28D 7/16; B33Y 70/00; B33Y 80/00; B33Y 10/00; F28F 27/00; B22F 10/00; B22F 2301/15
USPC ....................................................... 165/11.1
See application file for complete search history.

(56) References Cited

U.S. PATENT DOCUMENTS

| | | | |
|---|---|---|---|
| 4,972,902 A | 11/1990 | Ninomiya | |
| 5,600,057 A * | 2/1997 | Hansche | G01M 3/38 73/40.7 |
| 5,772,113 A * | 6/1998 | Gerstmann | F24H 4/04 237/8 R |
| 9,746,257 B2 * | 8/2017 | Fennessy | B22F 3/11 |

(Continued)

FOREIGN PATENT DOCUMENTS

| | | |
|---|---|---|
| DE | 1117148 B | 11/1961 |
| DE | 3128497 A1 | 2/1983 |

(Continued)

OTHER PUBLICATIONS

Extended European Search Report for EP Application No. 19215632.1, dated Jul. 28, 2020, pp. 9.

(Continued)

*Primary Examiner* — Tho V Duong
*Assistant Examiner* — Raheena R Malik
(74) *Attorney, Agent, or Firm* — Kinney & Lange, P. A.

(57) ABSTRACT

An additively manufactured heat exchanger configured to transfer heat between a first fluid and a second fluid includes a first channel with a first wall configured to port flow of a first fluid and a second channel with a second wall configured to port flow of a second fluid. The heat exchanger also includes a barrier channel containing unprocessed build powder provided by the additive manufacturing process and is located between the first wall and the second wall. The barrier channel is configured to prevent mixing of the first fluid and the second fluid when one of the first wall and the second wall ruptures.

12 Claims, 4 Drawing Sheets

(56) References Cited

U.S. PATENT DOCUMENTS

| | | | |
|---|---|---|---|
| 10,168,114 B2 | 1/2019 | Zager | |
| 10,300,530 B2 | 5/2019 | Hart et al. | |
| 10,323,887 B2 | 6/2019 | Fennessy | |
| 10,830,174 B1* | 11/2020 | Mook | F28F 7/02 |
| 11,255,614 B2* | 2/2022 | Streeter | B22F 5/106 |
| 2008/0072425 A1* | 3/2008 | Whittenberger | F28D 9/0025 |
| | | | 29/890.03 |
| 2015/0114611 A1* | 4/2015 | Morris | F28F 1/20 |
| | | | 29/890.036 |
| 2017/0045313 A1 | 2/2017 | Fennessy | |
| 2017/0232670 A1 | 8/2017 | Joerger et al. | |
| 2017/0336155 A1* | 11/2017 | Fennessy | B22F 10/28 |
| 2018/0347468 A1 | 12/2018 | Caimano et al. | |
| 2019/0249926 A1 | 8/2019 | Harris | |
| 2021/0033354 A1* | 2/2021 | Streeter | F28F 1/003 |
| 2021/0071959 A1* | 3/2021 | Streeter | F28F 21/087 |
| 2021/0254896 A1* | 8/2021 | Borghese | F28F 21/084 |
| 2021/0302109 A1* | 9/2021 | Colson | F28F 17/005 |

FOREIGN PATENT DOCUMENTS

| | | |
|---|---|---|
| EP | 1998131 A1 | 12/2008 |
| EP | 2963267 A1 | 1/2016 |
| EP | 3193123 A1 | 7/2017 |
| EP | 3284996 A1 | 2/2018 |
| EP | 3421916 A1 | 1/2019 |
| GB | 2519411 A | 4/2015 |

OTHER PUBLICATIONS

First Communication Pursuant to Article 94(3) EPC for EP Application No. 19215632.1, Dated Oct. 28, 2022, p. 5.

* cited by examiner

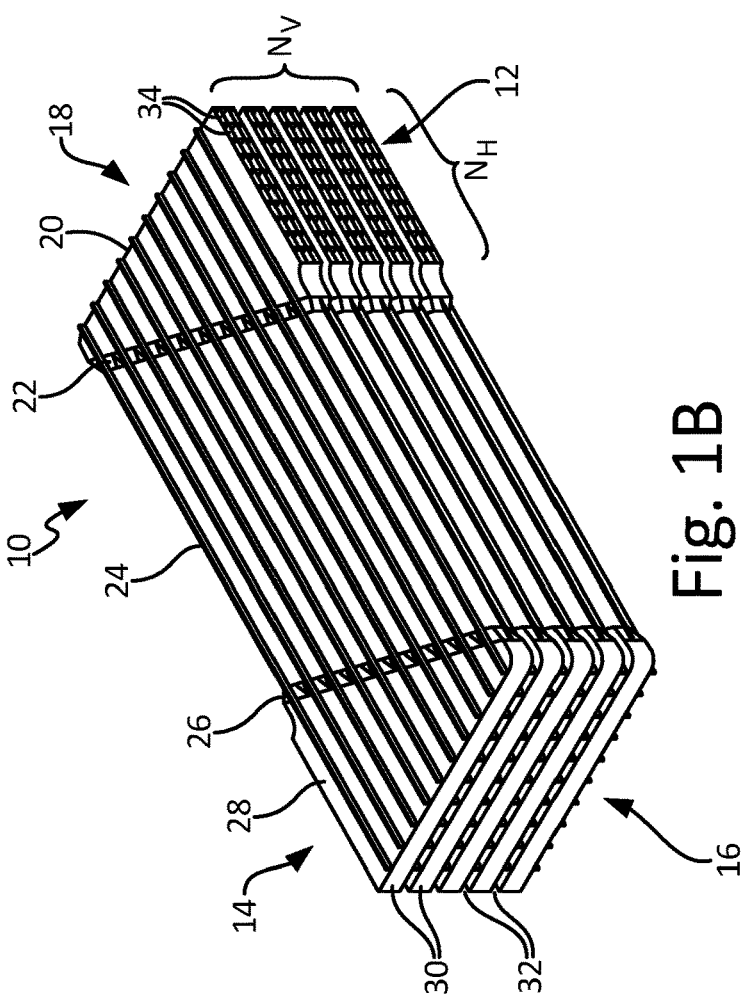
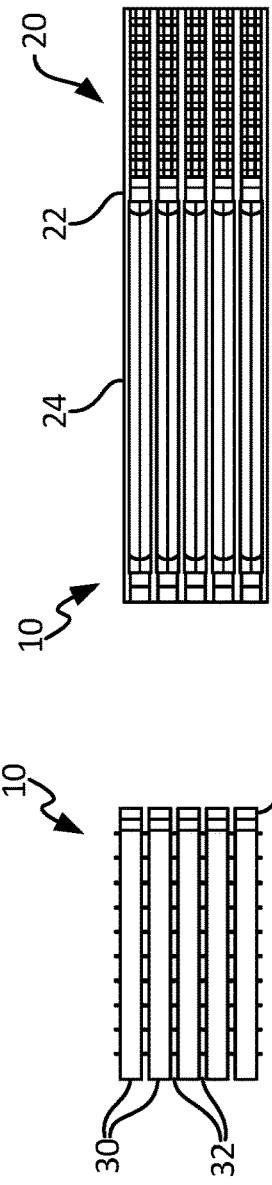
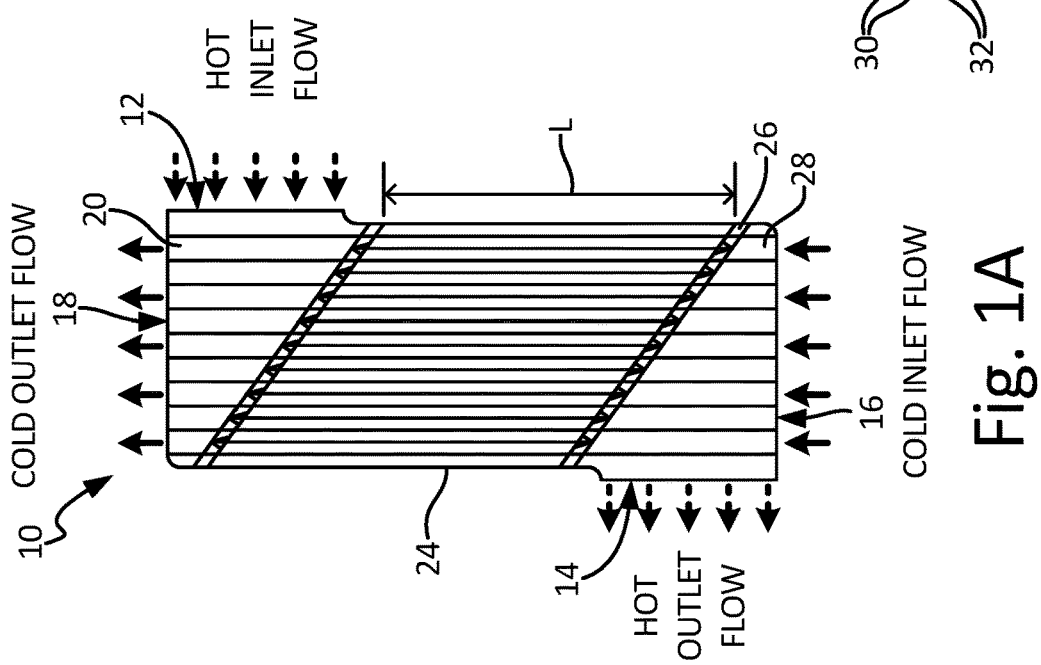

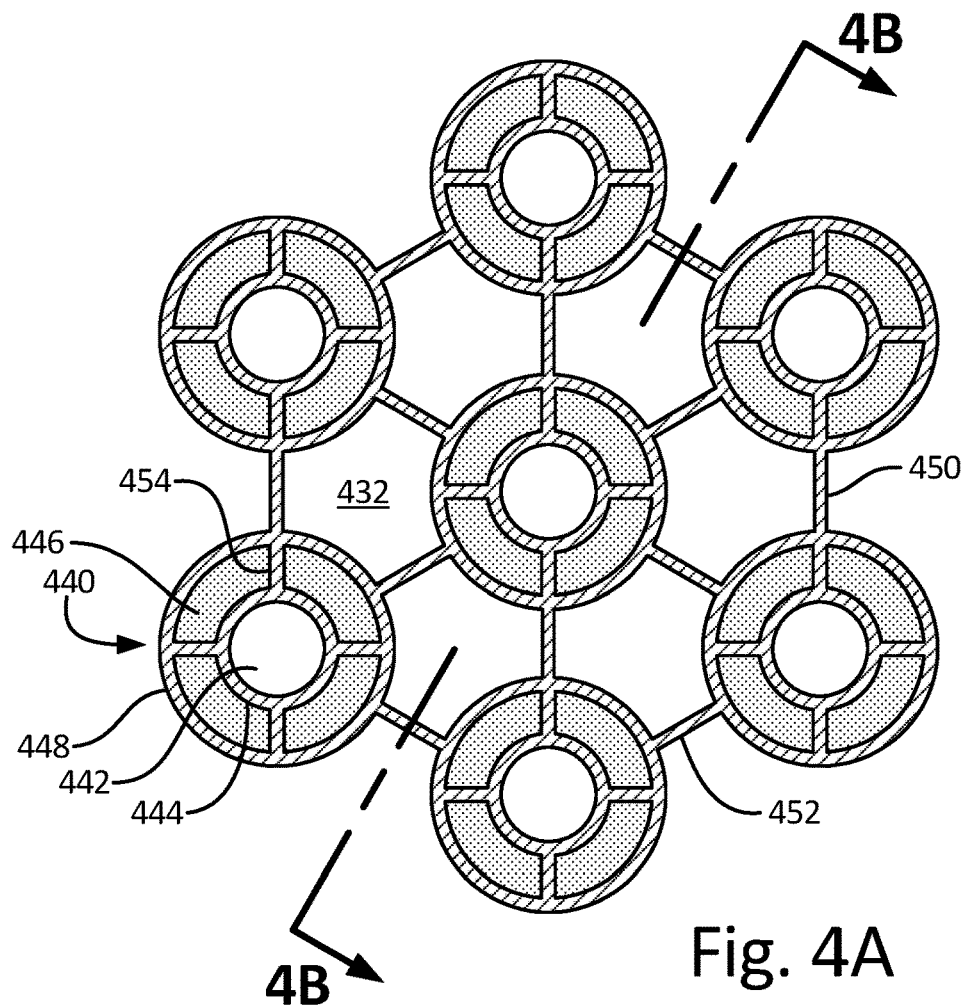
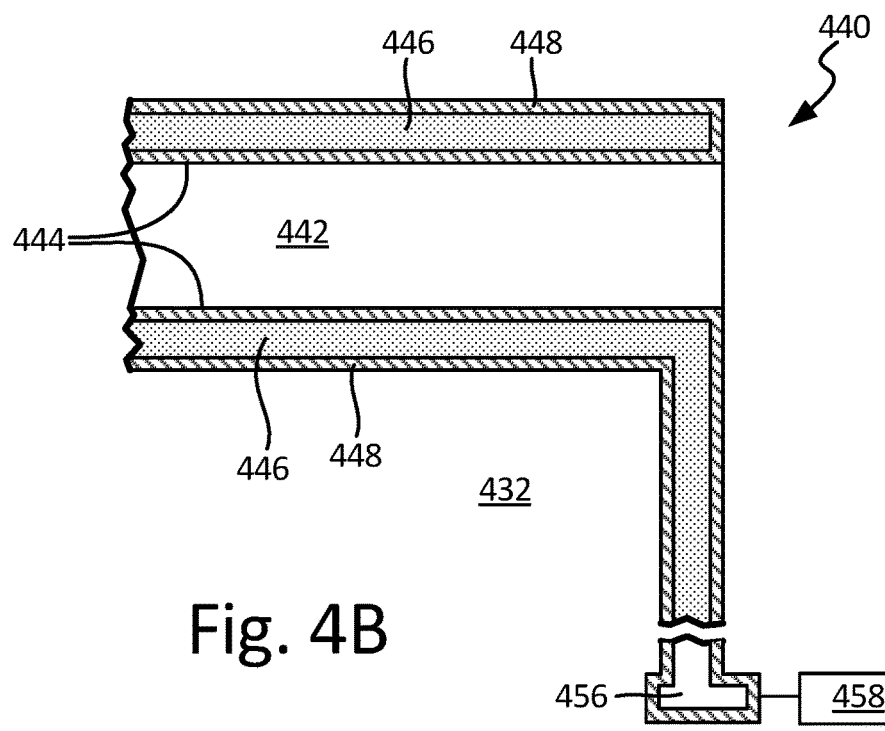

HEAT EXCHANGER WITH BUILD POWDER IN BARRIER CHANNELS

BACKGROUND

The present disclosure relates generally to thermal management. More specifically, this disclosure relates to heat exchangers in an aircraft having a gas turbine engine.

Heat exchangers are known in the aviation arts and in other industries for providing a compact, low-weight, and highly-effective means of exchanging heat from a hot fluid to a cold fluid. Heat exchangers that operate at elevated temperatures often have short service lives and/or require increased maintenance as a result of high cyclic thermal stress. The stress is caused by multiple system and component factors including rapid flow and/or temperature transients, physical shock, and so on. Stress loading can cause failure of the fluid boundary separating the hot and the cold fluids, thereby resulting in inter-stream contamination of one working fluid by the other. Inter-stream contamination can be disadvantageous, particularly if one of the working fluids is toxic or flammable.

Heat exchanger designs that attempt to reduce the incidence of inter-stream contamination are known in the art, with examples being double closure bars and "inactive" fin or gap layers in plate-fin heat exchangers, and double tube sheets in shell-tube heat exchangers. However, there is a need for a robust heat exchanger design that can reduce inter-stream contamination in the event of the failure of a heat exchanger core component.

SUMMARY

An additively manufactured heat exchanger configured to transfer heat between a first fluid and a second fluid includes a first channel with a first wall configured to port flow of a first fluid and a second channel with a second wall configured to port flow of a second fluid. The heat exchanger also includes a barrier channel containing unprocessed build powder provided by the additive manufacturing process and is located between the first wall and the second wall. The barrier channel is configured to prevent mixing of the first fluid and the second fluid when one of the first wall and the second wall ruptures.

A method for additively manufacturing a heat exchanger having a first channel, a second channel, and a barrier channel includes building a first wall defining the first channel having and configured to port flow of a first fluid, in a layer by layer process and building a second wall defining the second channel having and configured to port flow of a second fluid, in a layer by layer process. The method includes defining the barrier channel by the first wall and the second wall to prevent mixing of the first fluid and the second in the event of a rupture of either the first wall or the second wall and leaving unprocessed build powder in the barrier channel.

BRIEF DESCRIPTION OF THE DRAWINGS

FIG. 1A is a top view of a heat exchanger with barrier passages.

FIG. 1B is a perspective view of the heat exchanger shown in FIG. 1A.

FIG. 1C is a front view of the heat exchanger shown in FIG. 1A.

FIG. 1D is a side view of the heat exchanger shown in FIG. 1A.

FIG. 4A is a cross-sectional front view showing a fourth embodiment with seven hot flow assemblies.

FIG. 4B is the side view of the heat exchanger in FIG. 4A showing cross-sectional cut line 8A-8A.

DETAILED DESCRIPTION

Figure 2A:
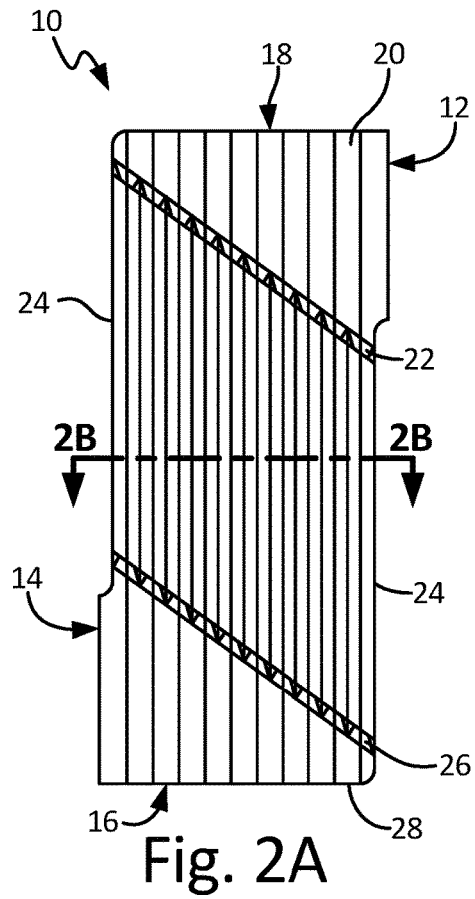
FIG. 2A is the top view of the heat exchanger shown in FIG. 1A showing cross-sectional cut line 2B-2B.

As aircraft engine efficiency has been improved over the years, there has been a general trend toward generating hotter temperatures in the engine core. Even when materials are used with higher heat tolerances, the parts within the engine core may still experience thermal fatigue over time. There is a need to effectively manage these temperatures in order to maximize the useful life of engine core parts.

A heat exchange device is disclosed herein, which effectively transfers thermal heat from a hot source to a heat sink within an aircraft engine while also meeting the stringent safety requirements of regulatory agencies. For example, ammonia may be a preferred refrigerant, but can be toxic if introduced into cabin air within the aircraft environmental control system. As such, it is critical to keep ammonia from mixing with air in an environmental control system during operation of the heat exchanger.

A barrier chamber is provided within the disclosed heat exchanger, which prevents mixing of the two fluids even in the event of a rupture of one of the flow channels of either the first fluid or the second fluid. This redundancy of the barrier chamber in addition to the walls of each flow channel provides an increased operating safety margin for the heat exchanger.

FIG. 1A is a top view of a heat exchanger with barrier passages. FIG. 1B is a perspective view of the heat exchanger shown in FIG. 1A. FIG. 1C is a front view of the heat exchanger shown in FIG. 1A. FIG. 1D is a side view of the heat exchanger shown in FIG. 1A. Shown in FIGS. 1A-1D are heat exchanger 10, hot inlet 12, hot outlet 14, cold inlet 16, cold outlet 18, inlet plenum 20, inlet transition region 22, core 24, outlet transition region 26, outlet plenum 28, hot layer 30, cold layer 32, and hot inlet port 34. Core length L is labeled in FIG. 1A, and the numbers of vertical layers $N_V$ and horizontal channels $N_H$ are labeled in FIG. 1B.

Hot inlet flow such as, for example the first fluid formed of bleed air, enters heat exchanger 10 at hot inlet 12, and the hot outlet flow exits heat exchanger 10 at hot outlet 14. The cold inlet flow such as, for example fuel, oil, or ammonia enters heat exchanger 10 at cold inlet 16, and the cold outlet flow exits heat exchanger 10 at cold outlet 18. In the illustrated embodiment, the hot fluid enters hot inlet 12 and exits hot outlet 14 at a direction that is about perpendicular to the direction of the cold fluid flowing from cold inlet 16 to cold outlet 18 though heat exchanger 10. Hot fluid flows through inlet plenum 20 which changes the hot flow direction about 90 degrees. Accordingly, the hot fluid flows counter-parallel to the cold fluid through core 24. In other embodiments the hot fluid can flow parallel to the cold fluid through core 24. After flowing through inlet plenum 20, the hot fluid flows through inlet transition region 22, core 24, outlet transition region 26, and through outlet plenum 28. In the illustrated embodiment, outlet plenum 28 changes the flow direction of the hot fluid about 90 degrees before exiting at hot outlet 14.

Heat transfer between the hot and cold fluid occurs throughout heat exchanger 10, including inlet plenum 20, inlet transition region 22, core 24, outlet transition region 26, and outlet plenum 28. Core length L characterizes the length of core 24, where the majority of heat transfer occurs in heat exchanger 10. An appreciable amount of heat transfer can also occur across inlet and outlet plenums 20, 28, and some heat transfer can also occur across outlet transition regions 22, 26. The relative sizes of core 24, inlet and outlet plenums 20, 28, and inlet and outlet transition regions 22, 26 can affect the amount of heat transfer that occurs in these corresponding areas in heat exchanger 10.

Heat exchanger 10 includes alternating hot layers 30 and cold layers 32, with any two vertically-adjacent hot layers 30 defining a cold layer 32 therebetween. The number of vertical layers $N_V$ refers to the number of hot layers 30 in heat exchange 10. In the illustrated embodiment, there are five hot layers 30, thereby defining four cold layers 32 therebetween. Each of cold layers 32 provides either a counter-parallel or a parallel flow path for cold fluid through heat exchanger 10. In some embodiments, hot layers 30 and cold layers 32 configurations are selected from the group consisting of plate fin, tube bundle, cross-flow, counter-flow, and multiple pass cross-counter-flow.

Heat exchanger 10 shown in FIGS. 1A-1D can be referred to as a "hot exterior" heat exchanger, because cold fluid does not flow exterior to the outermost hot layers 30. In some embodiments, cold fluid can flow exterior to the outermost hot layers 30. In any particular embodiment, the number of hot layers 30 will generally be similar to the number of cold layers 32. In other embodiments, heat exchanger 10 can have any number of hot and cold layers 30, 32.

As shown in FIG. 1B, the number of horizontal channels $N_H$ refers to the number of hot inlet ports 34 in each hot layer 30 in inlet plenum 20. In the illustrated embodiment, there are ten hot inlet ports 34 in each hot layer. Hot inlet 12 and hot outlet 14 generally have a rectangular envelope and provide the same number of hot inlet ports 34 in each hot layer 30. Accordingly, heat exchanger 10 can be described as having a rectangular cuboid geometrical shape. In some embodiments, hot inlet 12 and/or hot outlet 14 can have a non-rectangular geometrical configuration, with non-limiting examples being triangular and trapezoidal. In these other embodiments, the number of horizontal channels $N_H$ can be different across various hot layers 30.

The hot fluid can be referred to as a first fluid, and the cold fluid can be referred to as a second fluid. Accordingly, hot inlet 12 can be referred to as the first fluid inlet, hot outlet 14 can be referred to as the first fluid outlet, cold inlet 16 can be referred to as the second fluid inlet, cold outlet 18 can be referred to as the second fluid outlet, hot layers 30 can be referred to as the first fluid layers, cold layers 32 can be referred to as the second fluid layers, and hot inlet port 34 can be referred to as the first fluid inlet port. Hot and/or cold layers 30, 32 can also be referred to as hot and/or cold channels, respectively.

As shown in FIG. 1A, heat exchanger core 24 as viewed from the top has an outer geometric shape similar to a parallelogram. Accordingly, core length L can be said to be equivalent to the base of the parallelogram. In the illustrated embodiment, core length L is about 6 inches (15 cm). In some embodiments, core length L can range from about 2 inches (5 cm) to 24 inches (61 cm). In other embodiments, core length L can be less than 2 inches (5 cm) or more than 24 inches (61 cm). It is to be appreciated that in some embodiments of heat exchanger core 24, core length L can scale with the height and width of heat exchanger core 24. In a particular embodiment of heat exchanger core 24, core length L can be zero or nearly zero. Therefore, in that particular embodiment, all or nearly all of the heat transfer will take place across inlet and outlet plenums 20, 28, and some heat transfer can also occur across outlet transition regions 22, 26.

Heat exchanger 10 including core 24, inlet and outlet plenums 20, 28, and inlet and outlet transition regions 22, 26 can be formed by an additive manufacturing process. In an exemplary embodiment, powder bed fusion using techniques such as laser sintering, electron beam melting, or glue binder jetting can be used in an additive manufacturing process to fabricate heat exchanger 10 from metallic materials. In some embodiments, unprocessed powder (for example, un-sintered or un-melted powder) is left in the barrier channels shown in FIGS. 2B and 2C. Leaving unprocessed powder in the barrier channels eases manufacturing by eliminating the step of removing the unprocessed powder. Additionally, the barrier channels can be made much smaller compared to a heat exchanger where the unprocessed powder is removed from the barrier channels.

Non-limiting examples of metallic materials that can be used include nickel, aluminum, titanium, copper, iron, cobalt, and alloys thereof. In some embodiments, various alloys of Inconel™ can be used to fabricate heat exchanger 10, such as Inconel™ 625 and Inconel™ 718. In other embodiments, Haynes™ 282 can be used in fabricating heat exchanger 10. In yet other embodiments, alloys of aluminum such as, for example A205, can be used in fabricating heat exchanger 10.

Figure 2C:
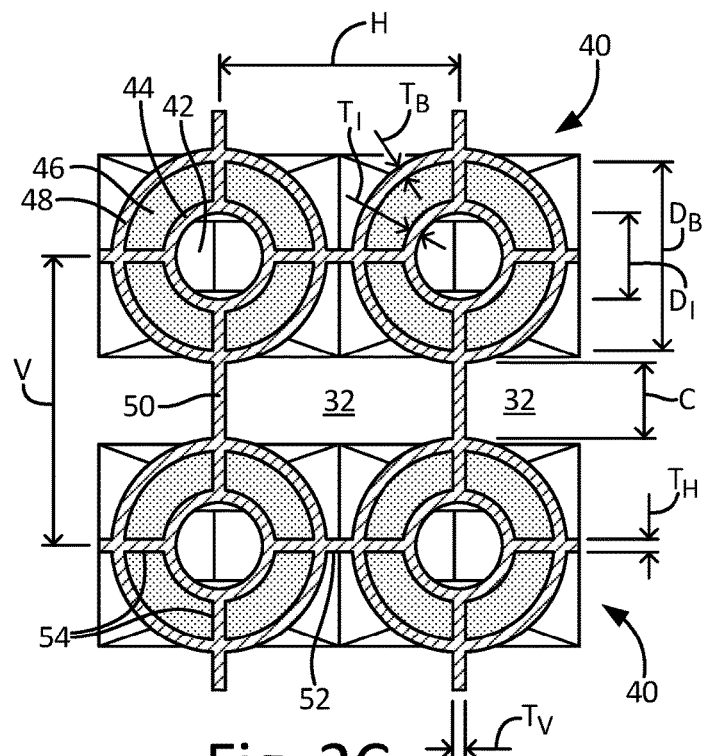
FIG. 2C is an enlarged cross-sectional front view showing four hot flow assemblies shown in FIG. 2A.
Figure 2B:
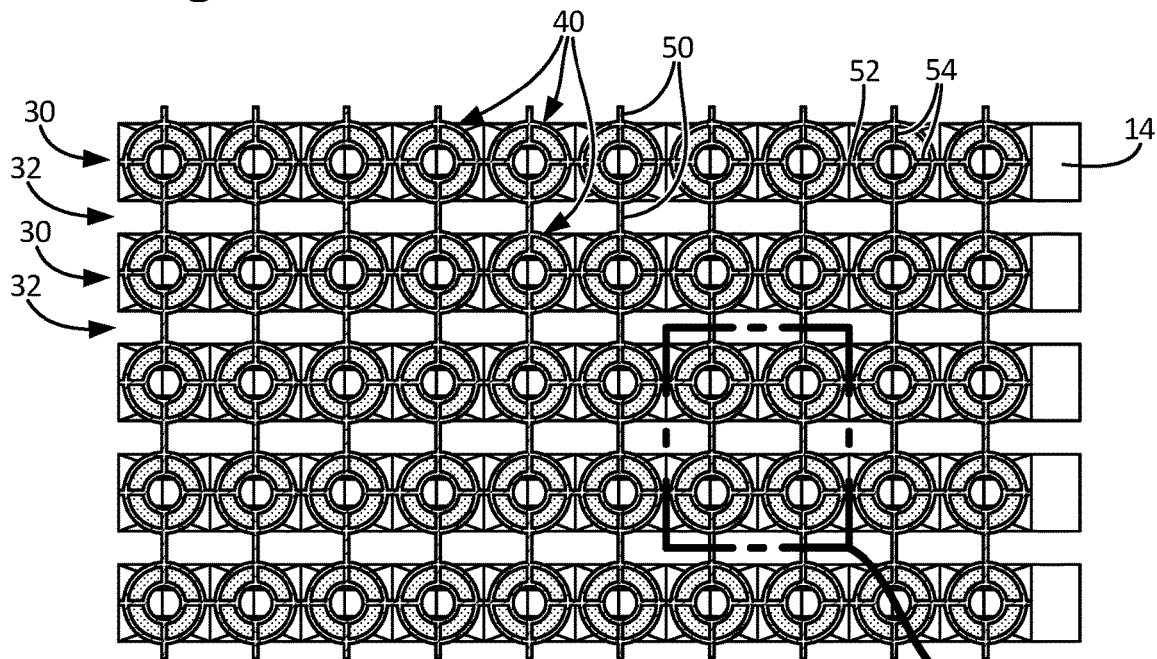
FIG. 2B is a cross-sectional front view showing the core area of the heat exchanger shown in FIG. 2A taken at cut line 2B-2B.

FIG. 2A is the top view of heat exchanger 10 shown and described above in FIG. 1A, showing cross-sectional cut line 2B-2B. FIG. 2B is a cross-sectional front view showing the core area of heat exchanger 10 shown in FIG. 2A taken at cut line 2B-2B. FIG. 2C is an enlarged cross-sectional front view showing four hot flow assemblies shown in FIG. 2B. Shown in FIGS. 2B-2C are hot layers 30, cold layers 32, hot flow assemblies 40, inner channels 42, inner channel walls 44, barrier channels 46, barrier channel walls 48, vertical vanes 50, horizontal vanes 52, and barrier channel vanes 54.

FIG. 2C also shows horizontal spacing H, vertical spacing V, cold channel height C, horizontal vane thickness $T_H$, vertical vane thickness $T_V$, inner channel diameter $D_I$, inner channel wall thickness $T_I$, barrier channel diameter $D_B$, and barrier channel wall thickness $T_B$. The cross-sectional view of core 24 shown in FIG. 2B depicts five hot layers 30 (where the number of vertical layers $N_V$=5), each having ten hot flow assemblies 40 (where the number of horizontal layers $N_H$=10). A cold layer 32 is sandwiched between any two adjacent hot layers 30. In the illustrated embodiment, each hot flow assembly 40 corresponds to an associated hot inlet port 34. In some embodiments, two or more hot flow assemblies 40 can correspond to an associated hot inlet port 34. In other embodiments, one hot flow assembly 40 can correspond to two or more associated hot inlet ports 34.

As shown in FIGS. 2B-2C, each hot layer 30 within core 24 includes a number of hot flow assemblies 40. Vertically-adjacent hot flow assemblies 40 (separated by a single cold layer 32) from one hot layer 30 to the next can be supported vertically by vertical vanes 50, and horizontally-adjacent hot flow assemblies 40 within any particular hot layer 30 can be supported horizontally by horizontal vanes 52. Each hot flow assembly 40 includes inner channel 42 located coaxially interior to an associated barrier channel 46, supported by barrier channel vanes 54. Each inner channel 42 is defined by an associated inner channel wall 44, and each barrier channel 46 is defined by an associated inner channel wall 44 and barrier channel wall 48.

The hot fluid flows in parallel through the various inner channels 42, the flow through each inner channel 42 being directed by an associated hot inlet port 34. Accordingly, inner channel walls 44 provide a pressure boundary for the hot fluid. The cold fluid flows through respective cold layers 32, with barrier channel walls 48 providing a pressure boundary for the cold fluid.

In some embodiments, horizontal spacing H can range from about 0.1 inch (2.5 mm) to 1 inch (25 mm). In other embodiments, horizontal spacing H can be less than 0.1 inch (2.5 mm) or greater than 1 inch (25 mm). In some embodiments, vertical spacing V can range from about 0.1 inch (2.5 mm) to 1 inch (25 mm). In other embodiments, vertical spacing V can be less than 0.1 inch (2.5 mm) or greater than 1 inch (25 mm). In some embodiments, cold channel height C can range from about 0.05 inch (1.3 mm) to 0.5 inch (13 mm). In other embodiments, cold channel height C can be less than 0.05 inch (1.3 mm) or greater than 0.5 inch (13 mm). In some embodiments, inner channel diameter $D_I$ can range from about 0.05 inch (1.3 mm) to 0.5 inch (13 mm). In other embodiments, inner channel diameter $D_I$ can be less than 0.05 inch (1.3 mm) or greater than 0.5 inch (13 mm). In some embodiments, barrier channel diameter $D_B$ can range from about 0.08 inch (2.0 mm) to 0.5 inch (13 mm). In other embodiments, barrier channel diameter $D_B$ can be less than 0.08 inch (2.0 mm) or greater than 0.5 inch (13 mm).

In some embodiments, horizontal vane thickness $T_H$, vertical vane thickness $T_V$, and barrier channel wall thickness $T_B$ are about the same thickness. Barrier channel vane thickness (not labeled) can be similar in dimension to horizontal and/or vertical vane thicknesses $T_H$, $T_V$. In some embodiments, horizontal vane thickness $T_H$, vertical vane thickness $T_V$, and/or barrier channel wall thickness $T_B$ can range from about 0.008 inch (0.2 mm) to 0.02 inch (0.5 mm). In other embodiments, horizontal vane thickness $T_H$, vertical vane thickness $T_V$, and/or barrier channel wall thickness $T_B$ can be less than 0.008 inch (0.2 mm) or greater than 0.02 inch (0.5 mm). In any embodiment, some or all of horizontal vane thickness $T_H$, vertical vane thickness $T_V$, barrier channel wall thickness $T_B$, and barrier vane thickness can be different from each other.

In some embodiments, unprocessed build powder is removed from cold layers 32 and inner channels 42, but left in place in barrier channels 46. While unprocessed build powder can be removed through the use of rotation, impact, and vibration techniques or by blowing out the powder with a compressed gas source, the barrier channel size and geometry can be limited to allow removal of the build powder using these techniques. For example, a barrier channel without any sharp turns or constricted flow paths may be limited to having a span (the distance from the inner channel wall to the barrier channel wall) of about 0.010 inches (0.25 mm) or more such that the powder may be removed using these techniques. However, a barrier channel with a tortured flow path, for example having sharp turns or constrictions in the flow path, may be limited to having a thickness of about 0.030 inches (0.75 mm) or more. However, if the build powder in the barrier channels is left in place, the thickness of barrier channel 46 can be about 0.008 inches (0.2 mm). In other words, the span between inner channel wall 44 and barrier channel wall 48 can be about 0.008 inches (0.2 mm). In other embodiments the thickness of barrier channel 46 is from 0.005 inches (0.13 mm) to 0.030 inches (0.75 mm), inclusive. In other embodiments, the thickness of barrier channel 46 can be greater than 0.030 inches (0.75 mm).

Leaving the build powder in place in the barrier channels eases the additive manufacturing process by eliminating the process step of removing the build powder from the barrier channels. Additionally, leaving the build powder in place allows a narrower barrier channel to be constructed. Build powder is also a better heat conductor compared to air. As such, a narrower barrier channel containing build powder may allow construction of a heat exchanger capable of exchanging more heat with the same footprint or allow construction of a heat exchanger capable of exchanging the same amount of heat with a smaller footprint compared to a heat exchanger with larger barrier channels filled with air or other matter less conductive than the build powder.

During normal operation of heat exchanger 10, each barrier channel 46 is devoid of working fluid. Only in the event of a rupture in either inner channel wall 44 or barrier channel wall 48 will a corresponding working fluid enter barrier channel 46. In the illustrated embodiment, barrier channels 46 are vented to the ambient. In the event of a material failure within heat exchanger 10, a leaking working fluid will flow into one or more barrier channels 46, thereby preventing the inter-stream contamination between the hot and cold fluids. In other words, barrier channels 46 can be described as providing leak prevention or barrier protection with reference to helping prevent mixing between the hot and cold fluid circuits. In some embodiments, drain 456 (shown in FIG. 4B) can be provided to direct the leaking fluid to a collection point that is observable by an operator. In some embodiments, detector 458 (shown in FIG. 4B) such as, for example, a pressure sensor can be provided to monitor for leakage into barrier channels 46.

Referring to FIG. 2C, heat transfer occurs across each of the hot flow assemblies 40 from the hot fluid within inner channels 42, through inner channel walls 44, across barrier channels 46, and through barrier channel walls 48 into the cold fluid within cold layers 32. In some embodiments, a portion of the heat transfer occurring within each one hot flow assembly 40 will be by thermal conduction radially through barrier channel vanes 54 from inner channel wall 44 to barrier channel wall 48. In these embodiments, the relative proportion of heat transfer through barrier channel vanes 54 depends on several factors such as, for example the thermal conductivity of the particular material used and the relative shape, size, and/or number of barrier channel vanes 54.

The foregoing description is based on the hot fluid having a higher temperature than the cold fluid, with the hot fluid being directed through the inner channels. In some embodiments, the hot fluid can be directed through the cold layers, and the cold fluid can be directed through the inner channels.

A leakage passage can be provided through each plenum vane in the barrier channels, thereby fluidly connecting all barrier channels together. The leakage passage, for example, can be an aperture, hole, or orifice, which allows a fluid to pass between adjacent barrier channels. The leakage passages can lead to a drain, providing a discharge path from heat exchanger 10 for any fluid that accumulates in the barrier channels. The barrier channels are normally devoid of working fluids, but a breach of either the hot or cold fluid boundary will result in the leakage of the respective fluid into one or more barrier channels, thereby preventing inter-stream contamination between the hot and cold fluid circuits. In some embodiments, the drain can be located at or near a gravity low-point of the heat exchanger, thereby providing for the gravity removal of fluid in one or more barrier channels from heat exchanger 10.

The drain can be configured to provide an indication of the presence of a leak, thereby providing an indication of a rupture of a hot and/or cold pressure boundary within the heat exchanger. The presence of fluid or build powder near the drain may be observable to a user and indicate the presence of a leak in the heat exchanger. A detector can also be placed near the drain to indicate the presence of a leak in the system. For example, a pressure sensor placed in the flow path of the drain can notify a user that a pressure change has occurred, which may be indicative of a leak in the heat exchanger.

Figure 3A:
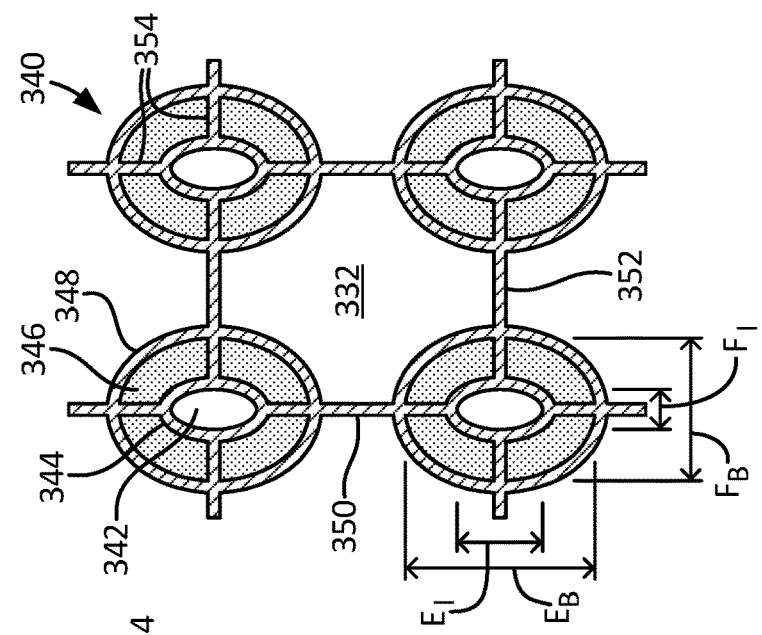
FIG. 3A is a cross-sectional front view showing a second embodiment of four hot flow assemblies.

FIG. 3A is a cross-sectional front view showing a second embodiment of four hot flow assemblies, a view that is similar to that shown above in regard to FIG. 2C. Shown in FIG. 3A are cold layer 132, hot flow assembly 140, inner channel 142, inner channel wall 144, barrier channel 146, barrier channel wall 148, vertical vanes 150, horizontal vanes 152, and barrier channel vanes 154, all of which have descriptions that are substantially similar to those provided above in regard to FIG. 2C, with the exception that each particular barrier channel 146 includes eight barrier channel vanes 154. In the illustrated embodiment, the eight barrier channel vanes 154 are spaced approximately equally around inner channel 142 and in each barrier channel 146, which connects inner channel wall 144 to barrier channel wall 148.

In some embodiments, more than or fewer than eight barrier channel vanes 154 can be used in a particular barrier channel 146, each having radial orientations that are different from those shown in the illustrated embodiment. Several factors can be considered in the selection of the quantity and alignment of barrier channel vanes 154 such as, for example, the need for greater structural support within the heat exchanger, the containment of relatively high hot fluid and/or cold fluid system pressures, the providing greater thermal conductivity from inner channel wall 144 to barrier channel wall 148 via barrier channel vanes 154, and additive manufacturing process optimization. In other embodiments, different hot flow assemblies 140 within the same heat exchanger can have different numbers of barrier channel vanes 154 throughout respective barrier channels 146.

Figure 3B:
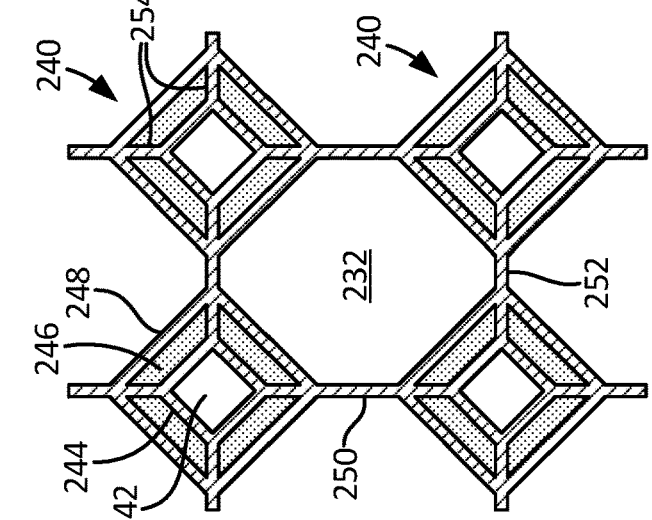
FIG. 3B is a cross-sectional front view showing a third embodiment of four hot flow assemblies.

FIG. 3B is a cross-sectional front view showing a third embodiment of four hot flow assemblies, a view that is similar to that shown above in regard to FIG. 2C. Shown in FIG. 3B are cold layer 232, hot flow assembly 240, inner channel 242, inner channel wall 244, barrier channel 246, barrier channel wall 248, vertical vanes 250, horizontal vanes 252, and barrier channel vanes 254. The features shown in FIG. 3B have descriptions that are substantially similar to those provided above in regard to FIG. 2C with the exception that inner channel wall 244 and barrier channel wall 248 have rhomboid cross-sectional geometries. The configuration shown in the illustrated embodiment can be advantageous in certain applications compared to a circular cross-sectional geometry such as, for example, providing greater structural strength and/or stability for the heat exchanger, controlling the stiffness of the heat exchanger along a particular axis, and optimizing the additive manufacturing process.

The configuration shown for inner channel wall 244 and barrier channel wall 248 in the illustrated embodiment uses square rhomboids. In some embodiments, inner channel wall 244 and/or barrier channel wall 248 can use non-square rhomboids such as, for example, kite-shape, parallelogram-shape, and irregular shape. In other embodiments, inner channel wall 244 and barrier channel wall 248 geometries can be different from each other. For example, in a particular embodiment, inner channel wall 244 can have a circular geometry and barrier channel wall 248 can have a rhomboid geometry.

Figure 3C:
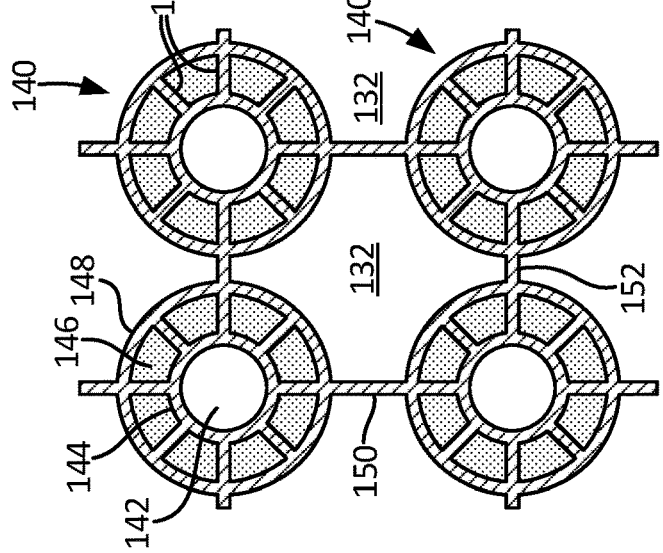
FIG. 3C is a cross-sectional front view showing a fourth embodiment of four hot flow assemblies.

FIG. 3C is a cross-sectional front view showing a fourth embodiment of four hot flow assemblies, a view that is similar to that shown above in regard to FIG. 2C. Shown in FIG. 3C are cold layer 332, hot flow assembly 340, inner channel 342, inner channel wall 344, barrier channel 346, barrier channel wall 348, vertical vanes 350, horizontal vanes 352, and barrier channel vanes 354. The features shown in FIG. 3C have descriptions that are substantially similar to those provided above in regard to FIG. 2C with the exception that inner channel wall 244 and barrier channel wall 248 have elliptical geometries. Also labeled in FIG. 3C are inner channel major axis length $E_I$, inner channel minor axis length $F_I$, barrier channel major axis length $E_B$, and barrier channel minor axis length $F_B$. In the illustrated embodiment, the major axis of inner channel 342 is defined by inner channel major axis length $E_I$ and barrier channel 346 is defined by barrier channel major axis length $E_B$.

An inner channel aspect ratio can be defined as the ratio of inner channel major axis length $E_I$ to inner channel minor axis length $F_I$. In the illustrated embodiment, the inner channel aspect ratio is about 1.25. In some embodiments, the inner channel aspect ratio can range from 1 to about 2.5. In other embodiments, the inner channel aspect ratio can be greater than 2.5. In an embodiment where inner channel major axis length $E_I$ is oriented horizontally, then inner channel 342 can be said to have a particular aspect ratio that is oriented horizontally.

A barrier channel aspect ratio can be similarly defined as the ratio of barrier channel major axis length $E_B$ to barrier channel minor axis length $F_B$. In the illustrated embodiment, the barrier channel aspect ratio is about equal to the inner channel aspect ratio. As the inner channel aspect ratio, the barrier channel aspect ratio can range from 1 to about 2.5. In other embodiments, the inner channel aspect ratio can be greater than 2.5. In some embodiments, the inner channel aspect ratio and the barrier channel aspect ratio can be different values from each other. For example, in a particular embodiment, inner channel 342 can be circular, having an inner channel aspect ratio of 1, and the barrier channel aspect ratio can be greater than 1.

In other embodiments, major axes of inner channel 342 and/or barrier channel 346 can be oriented in a direction that is other than horizontal or vertical. In other embodiments, the major axes orientations and the aspect ratios of inner channels 242 and/or barrier channels 346 can vary from one hot flow assembly 340 to another throughout a particular heat exchanger. In other embodiments, the cross-sectional shapes of inner channel 342 and/or barrier channel 346 can be triangular, pentagonal, hexagonal, octagonal, or oval.

FIG. 4A is a cross-sectional front view showing a fourth embodiment with seven hot flow assemblies, a view that is similar to that shown above in regard to FIG. 2C. Shown in FIG. 4A are cold layer 432, hot flow assembly 440, inner channel 442, inner channel wall 444, barrier channel 446, barrier channel wall 448, vertical vanes 450, horizontal vanes 452, and barrier channel vanes 454. The features shown in FIG. 4A have descriptions that are substantially similar to those provided above in regard to FIG. 2C with the exception that the flow assemblies 440 are arranged in a hexagonal geometry.

FIG. 4B is the side view of the heat exchanger in FIG. 4A showing cross-sectional cut line 4A-4A. Shown in FIG. 4B are cold layer 432, hot flow assembly 440, inner channel 442, inner channel wall 444, barrier channel 446, and barrier channel wall 448. In the illustrated embodiment, barrier channel 446 surrounding inner channel 442 are circumferentially related and in fluid communication. Additionally, barrier channels 446 are in fluid communication with one another in adjacent flow assemblies 440. For example, in the illustrated embodiment, a barrier channel running perpendicular to inner channel 442 can provide fluid communication between adjacent flow assemblies and/or the perpendicular barrier channel can be in fluid communication with drain 456.

In some embodiments, the additional barrier channels 446 run at an acute angle to the barrier channels surrounding inner channels 442. Having all barrier channels 446 in fluid communication with a common drain allows a user to identify a potential leak through visual inspection by detecting liquid or unprocessed build powder on the exterior of the heat exchanger or by detector 458 such as a pressure sensor signaling an increase in pressure at drain 456 due to a leak in either inner channel wall 444 or barrier channel wall 448.

Heat exchanger 10 in the foregoing embodiments is built using additive manufacturing techniques such as, for example, laser sintering, electron beam melting, and glue binder jetting. During the build process, unprocessed build powder is left in the barrier channels and the unprocessed powder is only removed from the inner channels and cold layers.

Leaving the build powder in place in the barrier channels eases the additive manufacturing process by eliminating the process step of removing the build powder from the barrier channels. This allows a narrower barrier channel to be constructed while still providing protection against the mixing of the two fluids when either the inner channel wall or the barrier wall ruptures.

Unprocessed build powder, which can have a density of about 80% compared to processed build powder, is also a better heat conductor compared to air. As such, a narrower barrier channel containing build powder may allow construction of a heat exchanger capable of exchanging more heat with the same footprint or allow construction of a heat exchanger capable of exchanging the same amount of heat with a smaller footprint compared to a heat exchanger with larger barrier channels filled with air or other matter less conductive than the build powder.

Unprocessed build powder present in the barrier channel can also dampen vibrational stress induced in the heat exchanger. In other words, the unprocessed build powder can act as a vibration suppressor under load compared to a barrier channel filled with another material such as air that is less resistant to vibrational forces.

Discussion of Possible Embodiments

The following are non-exclusive descriptions of possible embodiments of the present invention.

An additively manufactured heat exchanger configured to transfer heat between a first fluid and a second fluid includes a first channel with a first wall configured to port flow of a first fluid and a second channel with a second wall configured to port flow of a second fluid. The heat exchanger also includes a barrier channel containing unprocessed build powder provided by the additive manufacturing process and is located between the first wall and the second wall. The barrier channel is configured to prevent mixing of the first fluid and the second fluid when one of the first wall and the second wall ruptures.

The heat exchanger of the preceding paragraph can optionally include, additionally and/or alternatively, any one or more of the following features, configurations and/or additional components:

The heat exchanger includes a support member, extending between the first wall and the second wall.

The non-processed build powder is a nickel based super alloy.

The shape of the first channel is selected from the group consisting of trapezoid, rectangle, and annulus.

The span between the first wall and the second wall is from 0.005 inches (0.13 mm) to 0.030 inches (0.75 mm), inclusive.

The unprocessed build powder is configured to allow the first fluid or the second fluid to flow through the barrier channel.

The unprocessed build powder in the barrier channel is configured to dampen vibrational stresses in the heat exchanger compared to the barrier channel filled with another material such as air, which is less resistant to vibrational forces.

The heat exchanger includes a drain in fluid communication with the barrier channel and configured to pool liquid or unprocessed build powder on the exterior of the heat exchanger in the event of a rupture of either the first wall or the second wall.

The pool of liquid or unprocessed build powder is visible by a user.

The heat exchanger includes a drain in fluid communication with the barrier channel and a pressure sensor in fluid communication with the drain.

The pressure sensor is configured to send a signal to a user of an increase in pressure in the event of a rupture of either the first wall or the second wall.

The first channel and the second channel configurations are selected from the group consisting of plate fin, tube bundle, cross-flow, counter-flow, and multiple pass cross-counter-flow.

A method for additively manufacturing a heat exchanger having a first channel, a second channel, and a barrier channel includes building a first wall defining the first channel having and configured to port flow of a first fluid, in a layer by layer process and building a second wall defining the second channel having and configured to port flow of a second fluid, in a layer by layer process. The method includes defining the barrier channel by the first wall and the second wall to prevent mixing of the first fluid and the second in the event of a rupture of either the first wall or the second wall and leaving unprocessed build powder in the barrier channel.

The method of the preceding paragraph can optionally include, additionally and/or alternatively, any one or more of the following features, configurations and/or additional components:

The method includes building a support member, extending between the first wall and the second wall.

The non-processed build powder is a nickel based super alloy.

The shape of the first channel is selected from the group consisting of trapezoid, rectangle, and annulus.

The span between the first wall and the second wall is from 0.005 inches (0.13 mm) to 0.030 inches (0.75 mm), inclusive.

The unprocessed build powder is configured to allow the first fluid or the second fluid to flow through the barrier channel.

The unprocessed build powder in the barrier channel is configured to dampen vibrational stresses in the heat exchanger compared to the barrier channel filled with another material such as air, which is less resistant to vibrational forces.

The heat exchanger includes manufacturing a drain in fluid communication with the barrier channel and configured to pool liquid or unprocessed build powder on the exterior of the heat exchanger in the event of a rupture of either the first wall or the second wall.

The pool of liquid or unprocessed build powder is visible by a user.

The heat exchanger includes manufacturing a drain in fluid communication with the barrier channel and a pressure sensor in fluid communication with the drain.

The pressure sensor is configured to send a signal to a user of an increase in pressure in the event of a rupture of either the first wall or the second wall.

The first channel and the second channel configurations are selected from the group consisting of plate fin, tube bundle, cross-flow, counter-flow, and multiple pass cross-counter-flow.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An additively manufactured heat exchanger configured to transfer heat between a first fluid and a second fluid, the heat exchanger comprising:
   an alternating plurality of hot layers and a plurality of cold layers, wherein each of the plurality of hot layers provides a flow path through the heat exchanger for the first fluid and is separated from each other of the plurality of hot layers by one of the plurality of cold layers and each of the plurality of cold layers provides a flow path through the heat exchanger for the second fluid, wherein:
   each of the plurality of hot layers comprises a plurality of hot flow assemblies, each of the plurality of hot flow assemblies comprising:
      an inner channel configured to port flow of the first fluid, wherein the inner channel includes an inner channel wall; and
      a barrier channel coaxially exterior to the inner channel located between the inner channel wall and a barrier channel wall, wherein the barrier channel is configured to prevent mixing of the first fluid and the second fluid when one of the inner channel wall and the barrier channel wall ruptures and the barrier channel contains unprocessed build powder provided by an additive manufacturing process.

2. The heat exchanger of claim 1 and further comprising a barrier channel vane, extending between the inner channel wall and the barrier channel wall.

3. The heat exchanger of claim 1, wherein the unprocessed build powder is a nickel based super alloy.

4. The heat exchanger of claim 1, wherein the shape of the inner channel is selected from the group consisting of trapezoid, rectangle, and annulus.

5. The heat exchanger of claim 1, wherein the span between the inner channel wall and the barrier channel wall is from 0.005 inches (0.13 mm) to 0.030 inches (0.75 mm), inclusive.

6. The heat exchanger of claim 1, wherein the unprocessed build powder is configured to allow the first fluid or the second fluid to flow through the barrier channel.

7. The heat exchanger of claim 1, wherein the unprocessed build powder in the barrier channel is configured to dampen vibrational stresses in the heat exchanger compared to the barrier channel filled with another material that is less resistant to vibrational forces.

8. The heat exchanger of claim 1 and further comprising a drain in fluid communication with the barrier channel and configured to pool liquid or unprocessed build powder on the exterior of the heat exchanger in the event of a rupture of either the inner channel wall or the barrier channel wall.

9. The heat exchanger of claim 8, wherein the pool of liquid or unprocessed build powder is visible by a user.

10. The heat exchanger of claim 1 and further comprising a drain in fluid communication with the barrier channel and a pressure sensor in fluid communication with the drain.

11. The heat exchanger of claim 10, wherein the pressure sensor is configured to send a signal to a user of an increase in pressure in the event of a rupture of either the inner channel wall or the barrier channel wall.

12. The heat exchanger of claim 1, wherein the hot layer and the cold layer configurations are selected from the group consisting of plate fin, tube bundle, cross-flow, counter-flow, and multiple pass cross-counter-flow.

* * * * *